United States Patent [19]

Geffroy

[11] 3,917,290

[45] Nov. 4, 1975

[54] ASSEMBLY COMPRISING A PISTON GROOVE, A PISTON RING AND AN INERTIA RING SLIDING IN A CYLINDER

[76] Inventor: Robert Geffroy, 1, Blvd. Richard Wallace, Neuilly-Sur-Seine Hauts-de-Seine, France

[22] Filed: Nov. 28, 1973

[21] Appl. No.: 419,480

[30] Foreign Application Priority Data

Nov. 28, 1972 France .............................. 72.42306

[52] U.S. Cl. .................. 277/75; 277/173; 277/193
[51] Int. Cl.² ........................................... F16J 9/00
[58] Field of Search ........... 277/173, 176, 177, 188, 277/192, 193, 194, 195, 197, 165; 92/98, 183, 242

[56] References Cited
UNITED STATES PATENTS

| | | | |
|---|---|---|---|
| 3,582,093 | 6/1971 | Lucien .............................. | 277/177 |
| 3,632,121 | 1/1972 | Wahlmark .......................... | 277/194 |
| 3,727,925 | 4/1973 | Jones ................................. | 277/188 |
| 3,802,711 | 4/1974 | McGee ............................... | 277/197 |

*Primary Examiner*—Richard E. Aegerter
*Assistant Examiner*—L. Footland
*Attorney, Agent, or Firm*—Farley, Forster & Farley

[57] ABSTRACT

The invention relates, in a machine cylinder in which a piston is moved with an alternating motion, to an assembly including on said piston a groove and a ring which assembly reduces the disadvantages of the dephasing between the axial movements of the piston and those of its ring, by arranging at least one inertia ring in the piston ring groove, between one face of the groove and the piston ring, the said inertia ring sliding axially on the piston in a fluid-tight manner within the limits of the clearance between the piston ring, the inertia ring and the groove.

7 Claims, 6 Drawing Figures

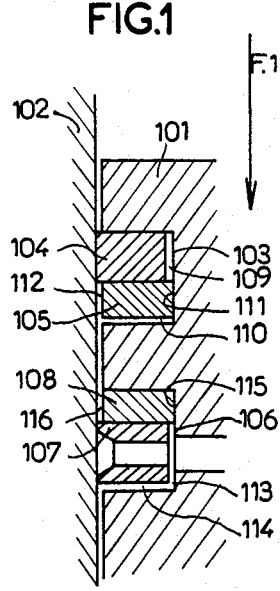
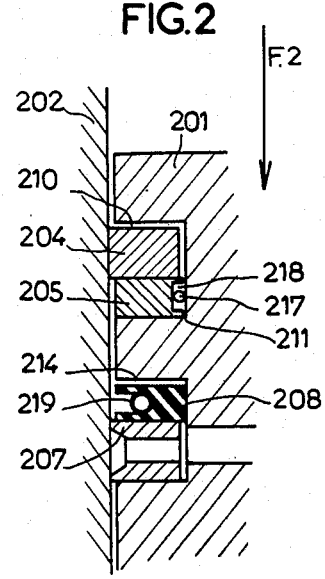
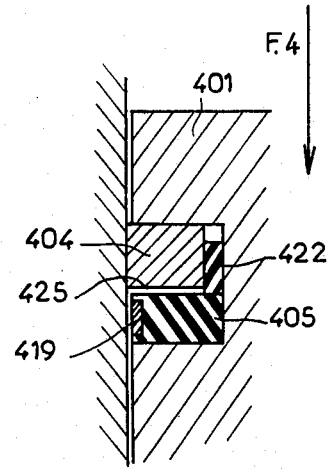
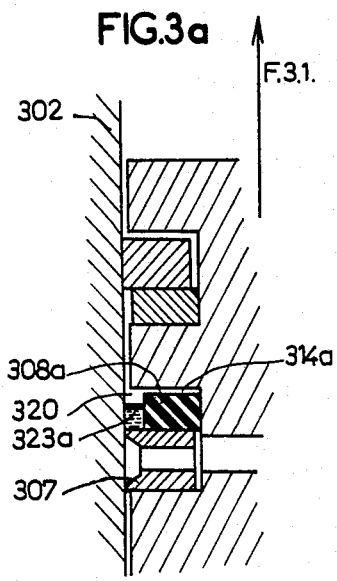
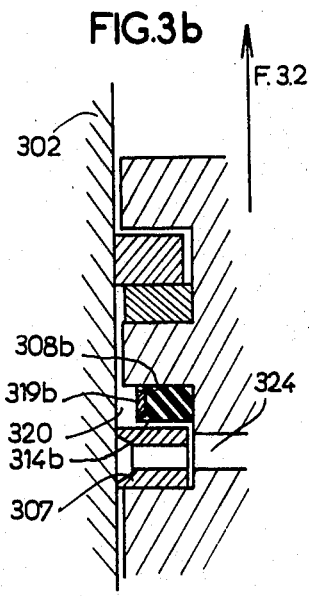
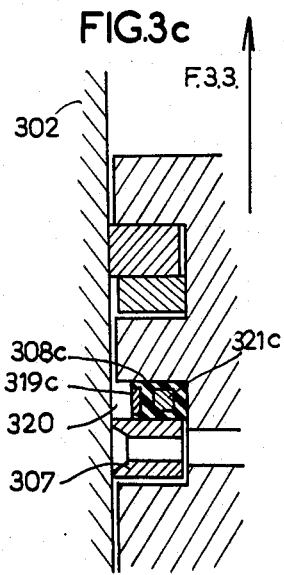

ASSEMBLY COMPRISING A PISTON GROOVE, A PISTON RING AND AN INERTIA RING SLIDING IN A CYLINDER

Piston rings working in a cylinder, for example the piston rings of a combustion engine, are displaced axially by travelling through the clearance of their groove like a valve with two directions opening alternately, by the play between their lateral faces and the lateral faces of their groove, the passage between the bottom of the groove and the annular spaces between the piston and cylinder, which are arranged on each side of the piston ring.

In order to carry out fully their valve function, the rings should occupy in their groove a definite position for each complete travel through the cycle, since the conditions facilitating the passage of the fluids between the combustion chamber and the crank-case act in the same direction during each complete travel.

Now, this is not the case, since amongst the three main forces, pressure, friction and inertia, which act at each instant of the cycle and determine the position of a piston ring in its groove, the inertia, which becomes predominant at high piston speeds, reverses in the middle of each travel. For this reason, except for compression rings during the travel of pistons under high pressures, the case of the combustion stroke of an engine piston, a ring begins the first part of each travel in support against the face of its groove which pushes it, that is to say the face which is to the rear of the movement, and terminates the same travel in support against the face of its groove which retains it, that is to say the face which is at the front of the movement.

The invention makes it possible to reduce the disadvantages of the de-phasing between the axial movements of the pistons and those of their rings, by arranging at least one inertia ring in the piston ring groove, between one face of the groove and the piston ring, the said inertia ring sliding axially on the piston in a fluid-tight manner within the limits of the clearance between the piston ring, the inertia ring and the groove.

This inertia ring fundamentally modifies the mechanism of the relations between the piston and the piston ring. In particular, on an engine piston, it reduces or eliminates the passage paths for the oil between the crankcase and the combustion chambers, the effects of the lateral wear of the piston rings and the piston grooves, and it gives to a compression ring a new efficiency of an oil scraper-ring.

Other characteristic features and advantages of the present invention will be brought out in the description which follows below, reference being made to the accompanying drawings, in which:

FIG. 1 is a fragmentary sectional view of a preferred embodiment of the present invention showing compression and oil control rings in respective piston grooves adjacent the cylinder wall each assembled in combination with an inertia ring;

FIG. 2 is a similar fragmentary view disclosing modified forms of the inertia rings;

FIGS. 3a, 3b and 3c are fragmentary views similar to FIG. 1 disclosing respectively three modified forms of the inertia ring associated with the oil control ring; and FIG. 4 is a fragmentary sectional view disclosing a single piston ring groove including a compression ring assembled with an inertia ring similar to that of FIG. 3b with an auxiliary back up ring for the compression ring.

FIG. 1 shows an engine piston 101 moving in the direction of the arrow F1 in a cylinder 102, during the first portion of the travel of the admission period, In a groove 103 are arranged a compression ring 104 and an inertia ring 105. In another groove 106 are disposed a scraper ring 107 and an inertia ring 108.

The compression ring 104 and the scraper ring 107 are of known types. They are applied in a fluid-tight manner by elastic expansion against the cylinder 102. The clearances 109, 110 for the compression ring and 113, 114 for the scraper ring, which are of the usual order, ensure the maintenance of their contact with the cylinder, irrespective of the radial differences in the movements of the piston. The inertia rings 105 and 108 slide on the piston by their internal faces 111 and 115; the clearances 110, 112 and 114, 116 ensure the maintenance of their contact with the piston in spite of the radial differences of the movements of the piston in the cylinder.

The rings 105 and 108 (FIG. 1) are of a metal having a certain elasticity, such as cast-iron, steel, bronze. They are cut in order that they may be given the opening between ends necessary for placing them in position, with an end clearance adjusted so as to be as small as possible during operation while hot, without risk of abutment, taking into account the tolerances of manufacture. They comprise an elastic gripping pre-stress and their internal faces 111 and 115 are formed so as to slide in a fluid-tight manner on the piston within the limits of the clearances 110 and 114.

FIG. 2 represents members similar to those of FIG. 1 during the end of the travel of the admission period (arrow F2).

The two inertia rings 205 and 208 are made in a different manner. The inertia ring 205 is of a metal such as cast-iron, steel or bronze. It is cut and has been given an elastic gripping pre-tension which, when once in position, maintains it closed by contact of the adjacent ends, which makes it a rigid ring, and its internal face 211 has a clearance on the piston.

A seal 217 is arranged in an annular chamber 218 which is formed between the ring and the piston. This chamber may indifferently be cut in the ring or in the piston. The chamber illustrated is formed in the ring. The seal 217 may be round so as to facilitate, by rolling inside its chamber, the sliding of the inertia ring on the piston. It may be of plastic and/or elastic material, for example of fluorinated elastomer, of which a production is known commercially by the name of "Viton".

The inertia ring 208 is of plastic material withstanding the ambient conditions of an engine piston ring, such as polytetra-fluoro-ethylene known particularly by the name of "Teflon", reinforced if so required by products which are mixed with it such as bronze, glass, graphite, molybdenum bisulphide. It is preferably cut in order to facilitate its mounting, with an end clearance sufficient to ensure its thermal elongation without the end faces coming into abutment against each other, and its internal face is held applied against the piston by an elastic means. The elastic means shown is a coil spring 219.

FIGS. 3a, 3b, 3c represent members similar to those of FIG. 1, during the compression stroke and the exhaust stroke.

FIG. 3a represents the first portion of the stroke of the piston (arrow F3.1), FIG. 3b shows the beginning of the second half of the stroke (arrow F3.2) and FIG. 3c shows the end of the stroke (arrow F3.3).

The inertia ring 308a of FIG. 3a is made of material which is elastic enough for it to be mounted without a cut, while preserving sufficient grip on the piston to slide thereon in a fluid-tight manner, such as a fluorinated elastomer, known in particular by the name of Viton.

The inertia rings 308b and 308c of FIGS. 3b and 3c are of a plastic material like the ring 208, but their elastic gripping means is constituted by an elastic ring 319b, 319c. This ring is made of an elastic metal such as spring steel, and comprises a split ring with an elastic gripping pre-tension.

The rings of the various figures must have a certain inertia since, contrary to the piston ring which is associated with them, the forces which control their actual movements are limited to the inertia and the friction of their sliding movement on the piston. If they are of plastic material, they may be made heavier by metallic ballast; the ballast inserted at 321c in the ring 308c is an example of this.

FIG. 4 shows an assembly according to the invention of an engine piston, during the beginning of the second half of the admission stroke (arrow F4), this assembly comprising a compression ring 404, an inertia ring 405 of plastic material, clamped on the piston 401 by an elastic ring 419 similar to the rings 319b and 319c, and a groove-bottom seal 422 of deformable material such as a fluorinated elastomer, particularly known by the name of Viton.

These assemblies according to the invention operate as follows: when the combined forces of pressure, friction and inertia apply the piston ring against the inertia ring, the operation of the piston ring remains the same as in a simple groove. However, if the inertia ring is made of a material favorable to fluid-tightness, such as polytetra-fluoro-ethylene, it improves the fluid tightness of the piston ring alone.

When, on the contrary, the combined forces displace the piston ring in its groove, freeing the inertia ring, when the inertia pushes it, the inertia ring follows the piston ring in its movement and thus closes the passage by the clearance of the segment in its groove, between the bottom of the piston ring groove and the clearnace between the piston and cylinder on the side of the inertia ring.

The various figures of the drawings show, on a four-stroke engine, the most important phases for the effectiveness of the assemblies according to the invention.

In FIG. 1, at the beginning of the admission stroke (arrow F1) the combined forces of pressure, friction and inertia apply the piston rings and the inertia rings against the pushing face of the groove towards the combustion chamber. The passage for the rise of oil through the clearance between the compression ring and its groove on the crank-case side is closed by the inertia ring 105. The scraper ring functions like a normal scraper ring without any changes.

In FIG. 2, at the end of this same admission stroke (arrow F2), the piston rings and the inertia rings are projected by inertia against the retaining face of their groove on the crank-case side. The passage for the upward movement of oil through the clearance between the scraper ring and its groove on the combustion chamber side, is closed by the inertia ring 208. The compression ring functions as a normal compression ring, except however for the increase in its fluid-tightness if the inertia ring is made of a material favorable to fluid-tightness, a plastic material for example.

In FIGS. 3a, 3b and 3c which represent three successive views of a piston similar to that above during the upward strokes of compression and exhaust, the operation is as follows:

During the first part (arrow F3.1) of the stroke (FIG. 3a), the piston rings and the inertia rings are applied against the pushing faces of the grooves on the crank-case side. There is no difference for the compression ring with a ring placed in a normal groove; on the other hand, for the scraper ring there is an important difference, since the return to the crank-case of the scraped oil, through the clearance between the scraper ring and the groove, which would be open with a normal piston ring and a normal groove, is closed according to the invention by the inertia ring 308a which isolates the clearance 314a. This is the reason for the provision of the reserve oil chamber 320, which receives the oil 323a scraped by the scraper ring.

During the first part of the second half (arrow F3.2) of the stroke (FIG. 3b), the inertia forces become reversed but the compression ring, its inertia ring and the scraper ring remain held against the face of their groove on the crank-case side by the effect of the friction of the rings on the cylinder. The inertia ring of the scraper ring 308b on the contrary is only subjected to inertia and is applied against the face of the groove on the combustion chamber side, opening through the clearance 314b, the groove bottom and the return orifices to the crank-case 324, the passage for the evacuation to the crank-case of the reserve oil 323a.

During the last part (arrow F3.3) of the stroke (FIG. 3c), the compression ring and the scraper ring together with their inertia rings are projected against the groove face on the combustion chamber side which holds them back and everything takes place as with normal rings.

To sum-up, in the example considered, applied to a four-stroke engine:

The upward oil passage has been closed under the compression ring during the first part of the admission stroke (arrow F1);

The upward oil passage has been closed on the scraper ring during the end of the admission stroke (arrow F2);

The lateral fluid tightness of each ring on its main working face has been improved to the extent that the material of the inertia ring utilized has favourable characteristics for fluid-tightness;

The groove clearance, hence the wear of the rings and the grooves, has no longer any importance, since the inertia ring annuls the effects of this clearance, irrespective of its value, at the important moments.

FIG. 4 shows a compression ring during the beginning of the second half (arrow F4) of the admission stroke, that is to say during a brief instant located between the part of the stroke F1 and the end of stroke F2. At this moment in fact, at the beginning of the second half of the stroke under the effect of the reversal of the inertia, the inertia ring of the compression ring 405 is projected against the groove face on the crank-case side, while the compression ring 404 is held by its friction on the cylinder against the face on the combustion chamber side.

Thus, for a brief instant, the clearance 425 with an assembly identical with that shown in FIG. 1, opens a passage for the upward movement of the oil towards the bottom of the groove of the compression ring. At that moment, the complementary bottom seal 422 of the groove which is subjected to the same rules of inertia as the inertia ring 405, remains in contact with this latter and closes the passage through the clearance 425.

This arrangement completes the closure of the passages for the upward movements of oil through the clearances of the compression ring. As a consequence of the improvement in its scraping effect, the compression ring acquires a new function as a single ring, preventing at the same time the passage of the gases from the combustion chamber to the crank-case and of the oil from the crank-case to the combustion chamber.

It will of course be understood that the present invention has been described and shown only by way of a preferred example, and that equivalents may be introduced into its constituent parts without thereby departing from the scope of the said invention as defined in the appended claims.

I claim:

1. An assembly comprising a cylinder, a piston, an axially floating piston ring and at least one axially floating inertia ring, in which the piston is moved with an alternating motion, said piston comprising a groove having side flanks and an internal face, said piston ring in said groove having an external face engaging said cylinder, an internal face with clearance relative to the internal face of said groove and side faces, said inertia ring arranged in said groove between one side face of said piston ring and the adjacent flank of said groove, said rings having a combined axial clearance in said groove relative to the entire surfaces of said side faces, said inertia ring including means for sliding in a fluid tight manner on the internal face of said groove within limits of clearance between said piston ring, said inertia ring and said groove.

2. An assembly as claimed in claim 1, in which said inertia ring is of metal, is provided with adjacent ends and is subjected to an elastic pre-tension closing said ends, the sliding and fluid-tightness of said inertia ring on said piston being ensured by the contact of the internal face of said inertia ring with the internal face of said piston groove, said contact being maintained by said elastic pretension and said ends being adjusted so as to give, under all working conditions, a positive but very small clearance.

3. An assembly as claimed in claim 1, in which the sliding movement and fluid-tightness of said inertia ring on said piston are ensured by the interposition of a sealing means between said inertia ring and the internal face of said piston groove.

4. An assembly as claimed in claim 1, in which said inertia ring is made of an elastic material such as a fluorinated elastomer of which a production is known by the name of Viton, and is mounted by expansion on said piston and ensures fluid-tightness of its internal face against said piston by elastic pressure.

5. An assembly as claimed in claim 1, in which said inertia ring is made of a plastic material such as polytetrafluoroethylene known by the name of Teflon and has spaced ends with clearance necessary to accommodate the thermal expansion of said material, and supplemental elastic means to effect the clamping of said inertia ring against the internal groove face of said piston.

6. An assembly as claimed in claim 1, in which said inertia ring has, over at least part of its height, an external diameter sufficiently distant from the wall of said cylinder, in order to constitute an annular oil reserve volume between said inertia ring and the wall of said cylinder.

7. An assembly as claimed in claim 1, in which said piston ring is a compression ring in which a seal of deformable material partially occupies the clearance space between said ring and the internal face of said groove, and is adapted to move axially under the effects of inertia.

* * * * *